J. W. AYLSWORTH.
APPARATUS FOR MAKING DUPLICATE PHONOGRAPH RECORDS.
APPLICATION FILED MAR. 12, 1907.
1,027,793.
Patented May 28, 1912.
2 SHEETS—SHEET 1.
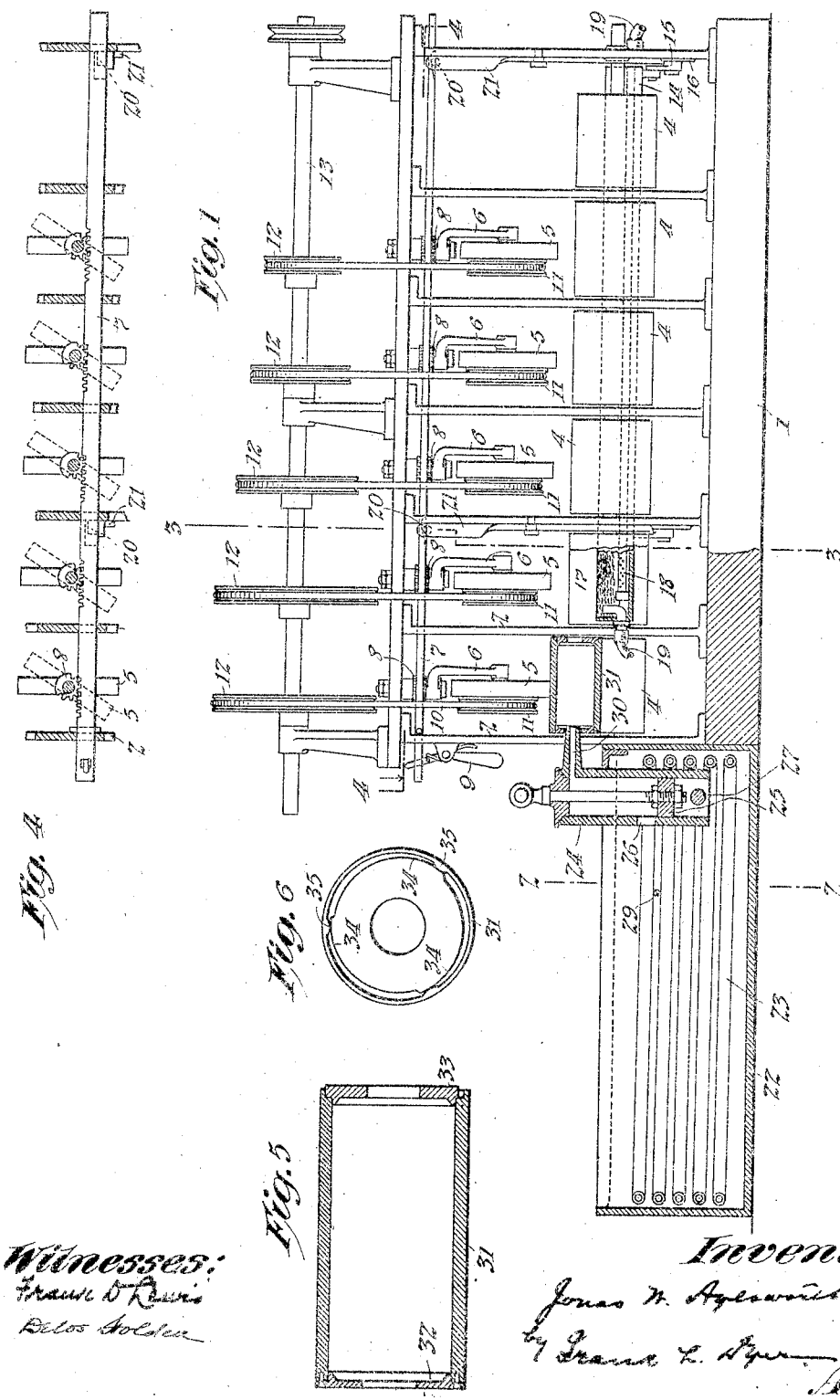

J. W. AYLSWORTH.
APPARATUS FOR MAKING DUPLICATE PHONOGRAPH RECORDS.
APPLICATION FILED MAR. 12, 1907.
1,027,793.
Patented May 28, 1912.
2 SHEETS—SHEET 2.
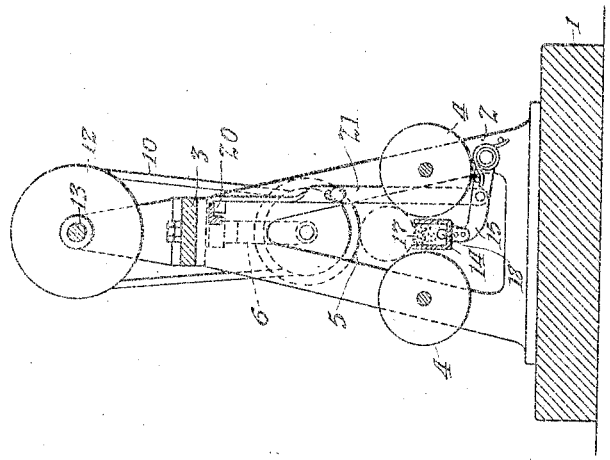
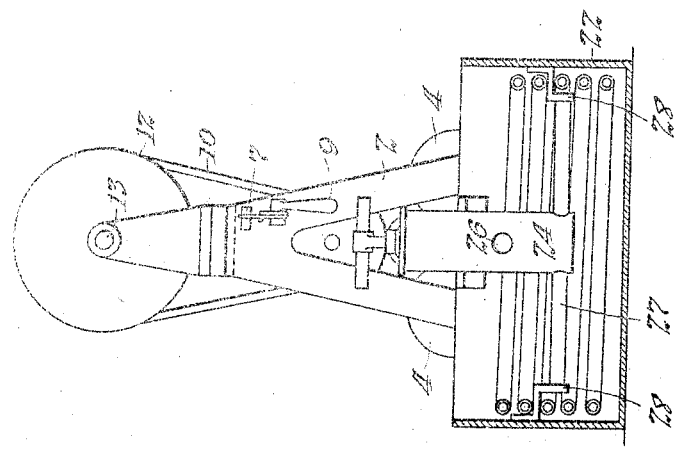
Witnesses:
Inventor:

UNITED STATES PATENT OFFICE.

JONAS W. AYLSWORTH, OF EAST ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

APPARATUS FOR MAKING DUPLICATE PHONOGRAPH-RECORDS.

1,027,793.   Specification of Letters Patent.   Patented May 28, 1912.

Original application filed May 11, 1906, Serial No. 316,250. Divided and this application filed March 12, 1907. Serial No. 361,957.

*To all whom it may concern:*

Be it known that I, JONAS W. AYLSWORTH, a citizen of the United States, residing at 223 Midland avenue, East Orange, county of Essex, and State of New Jersey, have invented certain new and useful Improvements in Apparatus for Making Duplicate Phonograph-Records, of which the following is a description.

This application is a division of United States Letters Patent No. 855,605, granted June 4, 1907.

My invention relates to improved apparatus for making duplicate phonograph records, and my object is to provide apparatus for the purpose by which duplicate phonograph records may be produced at low cost, of superior quality, and whereby the percentage of imperfect records or "discards" obtained in actual manufacture will be very largely reduced.

In the present development of the phonographic art, it is possible to make matrices or molds which for all practical purposes are mathematically exact negative copies of the original master records, and several processes have been suggested and commercially used for obtaining duplicates from these matrices or molds. In a practical duplicating process, it is important that the temperatures used should not be too high, since the material from which the records are made contains considerable quantities of free stearic acid, which in the presence of a high temperature attacks and roughens the surface of the mold, even when the latter is protected by a nonoxidizing film of gold or nickel. These molds are very expensive and the slightest roughening is manifested in the reproduction from a record obtained from the same. Hence, it is important that the temperature should be kept in the neighborhood of the melting point of the material, or at best, only a few degrees above the same, in order that the life of the molds may be prolonged as much as possible. In working with the material at relatively low temperatures another difficulty is encountered, namely, the formation of air and gas bubbles, which appear on the surface of the record. These bubbles are sometimes caused by the trapping of air in the mold, even when great care is taken to avoid the difficulty, and some are caused by the decomposition of the material in its original manufacture, or when scrap material is re-melted. The low temperature at which the material is worked makes it more or less viscid, and hence the bubbles do not have the opportunity of freely escaping, but move sluggishly through the mass.

By my present invention, I am enabled to produce duplicate records in a highly efficient and economical manner, the material being maintained in a molten state at not necessarily more than a few degrees above the melting point, so as to prevent it from attacking and corroding the mold, while at the same time, the operation is such that air and gas bubbles are effectively prevented from appearing on the record surface. To this end, the invention consists in the provision of apparatus for making duplicate records by centrifugal force, the mold being rotated at a sufficiently high speed and the molten material being introduced therein so as to be forced outwardly and distributed evenly around the entire bore of the mold, the mold being heated to about the temperature of the molten material, so that when the molten material is introduced therein, it will not chill on the mold, but will retain its fluid state, thereby permitting its complete and uniform distribution to be effected and allowing all bubbles to be displaced and forced into or through the body of material. This forcing of the bubbles inwardly away from the surface of the record can be effected rapidly and perfectly, since the tendency of the material to displace the bubbles, (provided the speed of rotation is high enough) may be made very much more decided than if the bubbles are allowed merely to float to the surface as at the present time. Consequently, by using centrifugal force, bubbles may be effectively forced back from the record surface even when such bubbles are so minute that their tendency to rise to the surface of the material is not sufficient to overcome the natural viscosity of the material. Yet, these very minute bubbles which are due to decomposition within the material are prominent enough to seriously affect the character of the reproduction. Having introduced the molten material in the rapidly turning mold, so as to uniformly distribute the material over the bore of the mold, it is of course important that the mold should continue to rotate until the material becomes hard enough to retain its shape, but obviously the speed of rotation can be gradually reduced as the material becomes gradually hardened.

It will of course be understood, that the general principles of the invention can be carried out in many different ways, and in many different forms of apparatus. Preferably, however, the apparatus is one in which a practically continuous process can be carried on, a succession of molds being at all times undergoing treatment, so that when, for example, the step of introducing the molten material into one of the molds, is being carried out, the record will be practically finished in a previously introduced mold in which the several operations have been performed, all as I will more fully hereinafter describe and claim.

In the accompanying drawings, forming part of this specification, I illustrate a convenient apparatus for the purpose, said apparatus being simple in construction and capable of effective operation by comparatively unskilled labor.

In these drawings Figure 1, is a side elevation, partly in section, Fig. 2, a cross sectional view on the line 2—2 of Fig. 1, Fig. 3, a similar view on the line 3—3 of Fig. 1, Fig. 4, a horizontal sectional view on the line 4—4 of Fig. 1, Fig. 5, a longitudinal sectional view of the mold showing the end plates in position, and Fig. 6, an end view of the same illustrating the removable end plate.

In all of the above views, corresponding parts are represented by the same numerals of reference.

Carried by a heavy substantial base 1 are the frames 2—2, rigidly connected at their upper ends by a top plate 3. Mounted between the frames 2 are rollers 4—4, arranged in pairs and independently rotatable, so that they may turn at any desired speed. These rollers are not independently driven, but act merely as roller supports for the molds as the latter are rotated. The molds are rotated by a series of driving rollers 5—5 having preferably rubber or fiber peripheries, so as to increase the friction on the mold. These driving rollers are carried by brackets 6—6 and normally occupy the position shown in full lines (Fig. 4) so as to turn in a plane perpendicular to the axis of the molds. By skewing the driving rollers from their normal position as shown in dotted lines (Fig. 4) the molds would not only be rotated as desired, but will be moved longitudinally, as will be understood, so as to engage with and be supported by the successive idler rollers 4—4, moving in this way from the left to the right of the machine in Fig. 1. The skewing of the driving rollers is effected by any suitable mechanism; for instance a rack bar 7, engaging toothed segments 8 on the bracket 6 of each roller and operated by a handle 9 whereby all the rollers will be moved axially. The driving rollers 5 are rotated by suitable mechanism, such as belts 10, engaging pulleys 11, carried by the driving rollers and driven by pulleys 12 on the main shaft 13. I illustrate the first two pulleys 12 at the left as being of the same diameter so as to rotate the molds at the same speed during the first two stages of the operation, the succeeding pulleys being of gradually reduced dimensions, so as to rotate the molds at less speed. Provision is made for cooling the molds after the material has been uniformly distributed therein, so as to effect a chilling and solidifying of the material, and for this purpose I illustrate a trough 14, located between the idler rollers 4, beginning with the second set thereof, since of course the molds should not be chilled during the introduction of the material therein. This trough is carried on arms 15 adapted to be normally pressed upwardly by a spring 16, so as to engage the molds with a light elastic pressure. The trough 14 is substantially filled with a loose absorbent material 17, such as fiber or sponge. Cooling water is admitted to the trough 14, through a perforated pipe 18, so as to always keep the absorbent material fully saturated. The inlet and overflow pipes are connected by rubber sections 19, so as to permit the trough to be moved up and down into and out of engagement with the molds. The trough 14 is moved downwardly when the rollers are skewed to permit the molds to move longitudinally. This movement may be derived from the rack bar 7 by forming the same with cams 20, with which engage rollers on the rods 21, the latter being connected to the pivoted arms 15. Obviously, as the rack bar 7 is moved to the right to skew the rollers, the trough 14 will be depressed so as to withdraw the absorbent material from contact with the molds.

The molten material may be contained in a tank 22, heated in any suitable way as for instance, by a steam coil 23. Mounted in the tank 22 is a simple form of pump 24, the piston 25 of which is adapted to travel below an inlet 26, so as to permit the molten material to enter the pump cylinder above the piston to thereby always give a definite charge of material, assuming the level of the latter, (shown in dotted lines, Fig. 1) to be constantly maintained. The pump 24 is carried on a bar 27 mounted to turn in brackets 28 secured to the sides of the tank 22. When the molds are being successively introduced into the machine, the pump is swung rearwardly to occupy an inclined position, resting on the stop 29. At all times, it will be observed that the pump cylinder is more or less immersed in the molten material, so as to be effectively heated by the same, and thereby preventing congealing. The discharge of the pump comprises a nozzle 30, adapted, when the pump cylinder is in a vertical position, to enter the mold 31. These molds are of any suitable type and are formed in any suitable manner. Preferably, they are provided with the ordinary end piece 32, on which the name of the selection is engraved or electrotyped, and with a removable end piece 33 at the other end, so that the molten material will be confined within the mold as the latter rotates. The removable end piece 33 fits the end of the mold very snugly, so as to prevent leakage of the molten material at this point, and is locked in position in any suitable way. For instance, I show the same as being formed with a series of cams 34, adapted to engage projections 35, formed on the mold, so that by inserting the end piece 33 in position, and giving it a partial turn, it will be locked frictionally firmly in place.

In the operation of apparatus of this general type, and assuming the tank 22 to contain the molten material (for instance the composition described in my Patent No. 782,375 dated February 14, 1905,) maintained at a temperature from 10 to 25 degrees above its melting point, I proceed as follows:—The handle 9 is operated so as to swing the driving rollers 5 to or toward the position shown in dotted lines (Fig. 4) and one of the molds 31 being placed on the first set of idler rollers 4—4 and engaged by the corresponding driving rollers 5, will by the latter be turned at the desired high speed and at the same time will be moved longitudinally to the position shown in Fig. 1. The handle 9 is now returned so that the mold will be rotated in this position. The pump 24 is now swung to its vertical position and the plunger is elevated, carrying the charge of molten material and discharging the same into the rotating mold, the temperature of which has been previously heated up to or preferably slightly a little more than the temperature of the molten material. The molten material will, therefore, be distributed uniformly throughout the mold and by reason of the centrifugal force developed will be maintained in its liquid state and evenly disposed over the record surface, so as to take a very perfect impression therefrom. Since the temperature of the material is somewhat higher than its melting point, and since the mold is preferably at or about the same temperature, the material remains perfectly fluid during the time that it is being disposed over the record surface, and consequently ample opportunity is offered for displacing any bubbles, however minute, and forcing them radially inward. Even if these bubbles do not entirely escape through the liquid material, they are at least driven in from the record surface, which will therefore be perfect and free from bubbles. As soon as the charge of material has been delivered to the molds, the pump is swung rearwardly. The handle 9 is again operated to skew the driving rollers 5, and the mold with its charge of material therein will be advanced longitudinally so as to be engaged by the second driving roller and brought into position over the second set of idlers. At the same time, a new mold is introduced over the first set of idlers and is filled with material, as explained. When the mold with its charge of material therein has been thus advanced from the first section of the machine where the filling operation takes place, it will, when normally rotated by the successive driving rollers, be engaged by the cooling pad in the trough 14. These operations are repeated, the filled molds progressing step by step toward the right of the machine and being rotated at successively reduced rates, as the material is gradually cooled and becomes solid. I prefer to dispense with a driving roller in connection with the last set of idlers, at which point the material will be sufficiently solidified to retain its shape, the mold with its contents being then removed from the machine. The cap 33 is now removed and after the record has been contracted sufficiently away from the bore of the mold, it is removed. By always introducing a fixed and definite charge of material into the mold, the necessity for reaming the bore of the finished duplicate records is done away with, although this operation can be performed if considered desirable. It will furthermore be seen that by using two end caps, the duplicate records will be finished at both ends when removed from the mold.

If it is desired to provide the duplicate records with tapering bores, this may be effected by arranging the idler rollers 4 on an incline or by inclining the entire machine to a sufficient extent, whereby the material when introduced into the mold, will accumulate to a greater extent at the lower end than at the upper end and will set in this position, after which the bore, if not straight, may be finished by reaming, or a tapering bore may be entirely formed by a reaming operation, as will be understood.

Having now described my invention, what I claim as new and desire to secure by Letters Patent is as follows:

1. In apparatus for making duplicate phonograph records, the combination of devices for rotating a plurality of molds at a high speed in a substantially continuous horizontal series, and for progressing the same throughout the series, and means for introducing a charge of molten material in each mold introduced at the forward end of the series, whereby the charge of material in each mold will be uniformly distributed therein by centrifugal force and will be permitted to cool and solidify as the molds are progressed longitudinally, substantially as set forth.

2. In apparatus for making duplicate phonograph records, the combination of devices for rotating a plurality of molds at a high speed in a substantially continuous horizontal series, and for progressing the same throughout the series, and a pump so arranged that its nozzle may enter each mold introduced at the forward end of the series, said pump being connected with a source of molten material whereby the charge of material introduced in each mold will be uniformly distributed therein by centrifugal force, and will be permitted to cool and solidify as the molds are progressed longitudinally, substantially as set forth.

3. In apparatus for making duplicate phonograph records, the combination of devices for rotating a plurality of molds at high speed in a substantially continuous horizontal series, and for progressing the same throughout the series, a tank for containing the molten material and a pump mounted in said tank and whose nozzle is arranged to enter each mold introduced at the forward end of the series, whereby a charge of molten material may be introduced within each mold immediately after its addition to said series so as to be uniformly distributed therein by centrifugal force, and be permitted to cool and solidify as the molds are progressed longitudinally, substantially as set forth.

4. In apparatus for making duplicate phonograph records, the combination with means for rotating the mold at high speed, of a tank for containing molten material, and a pump pivotally mounted in said tank, and having a nozzle adapted to be swung into position to enter said mold, substantially as set forth.

5. In apparatus for making duplicate phonograph records, the combination of devices for rotating a plurality of molds at high speed in a substantially continuous horizontal series, and for progressing the same throughout the series, means for introducing a charge of molten material in each mold introduced at the forward end of the series, whereby the charge of material in each mold will be uniformly distributed therein by centrifugal force, and means for applying a cooling media to the successive molds so as to solidify the charges of material therein as the molds are progressed longitudinally, substantially as set forth.

6. In apparatus for making duplicate phonograph records, the combination with means for rotating the mold at a high speed, of means for introducing a charge of molten material within the mold, means for applying cold to the mold to chill its contents, and means for successively reducing the speed of rotation of the mold, substantially as set forth.

7. In apparatus for making duplicate phonograph records, the combination of a pair of idler rollers, a driving roller coöperating with the same, means for skewing the driving roller, a mold supported by the idler rollers and advanced longitudinally by the driving roller, and means for introducing a charge of molten material to the rotating mold, substantially as set forth.

8. In apparatus for making duplicate phonograph records, the combination of a series of pairs of idler rollers, a series of driving rollers coöperating with the same, a series of molds supported by the idler rollers, and driven by the driving rollers, means for causing the driving rolls to advance the molds successively with respect to the idler rollers, and means for introducing charges of molten material into the successive molds, substantially as set forth.

9. In apparatus for making duplicate phonograph records, the combination of successive pairs of idler rollers, a series of driving rollers coöperating with the same, a series of molds supported by the idler rollers and driven by the respective driving rollers, means for introducing charges of molten material successively to the said molds, and means for cooling the molds after material has been introduced therein, substantially as set forth.

10. In apparatus for making duplicate phonograph records, the combination of successive pairs of idler rollers, a series of driving rollers arranged to be swung pivotally and coöperating with the idlers, a series of molds carried by the idler rollers and rotated and advanced longitudinally by the driving rollers, and means for introducing charges of molten material successively to said molds, substantially as set forth.

11. In apparatus for making duplicate phonograph records, the combination of successive pairs of idler rollers, a series of driving rollers arranged to be swung pivotally and coöperating with the idlers, a series of molds carried by the idler rollers and rotated and advanced longitudinally by the driving rollers, means for introducing charges of molten material successively to said molds, and means for cooling the molds after the introduction of the molten material therein, substantially as set forth.

12. In apparatus for making duplicate phonograph records, the combination of a pair of idler rollers, a driving roller cooperating with the same, a mold supported by the idler rollers and rotated by the driving roller, means for moving the driving roller pivotally so as to advance the mold longitudinally, means for normally applying cold to the rotating mold, and means for withdrawing the cooling media therefrom when the driving roller is moved pivotally, substantially as set forth.

13. In apparatus for making duplicate phonograph records, the combination of a pair of idler rollers, a pivotally mounted driving roller coöperating with the same, a mold supported by the idler rollers and rotated by the driving roller, a cooling pad normally in contact with said mold, and means for simultaneously skewing the driving roller and withdrawing said pad from the mold, substantially as set forth.

14. In apparatus for making duplicate phonograph records, the combination of a pair of idler rollers, a driving roller coöperating with the same, a mold supported by the idler rollers and rotated by the driving roller, and a pivotally mounted pump normally moved away from the mold but adapted to be moved to a position where the pump nozzle will enter the mold, substantially as set forth.

15. A coreless cylindrical mold for the production of duplicate phonograph records, having a plurality of fixed stops at one end thereof and provided with a fixed end plate and a removable end plate, the latter having a series of cams thereon for engaging the stops on the mold, whereby the removable end plate may be locked frictionally in position, substantially as set forth.

This specification signed and witnessed this 9th day of March 1907.

JONAS W. AYLSWORTH.

Witnesses:
 FRANK D. LEWIS,
 FRANK L. DYER.